June 9, 1931. R. F. SMITH 1,809,362
DIRECTION INDICATOR
Filed Feb. 5, 1927  3 Sheets-Sheet 1
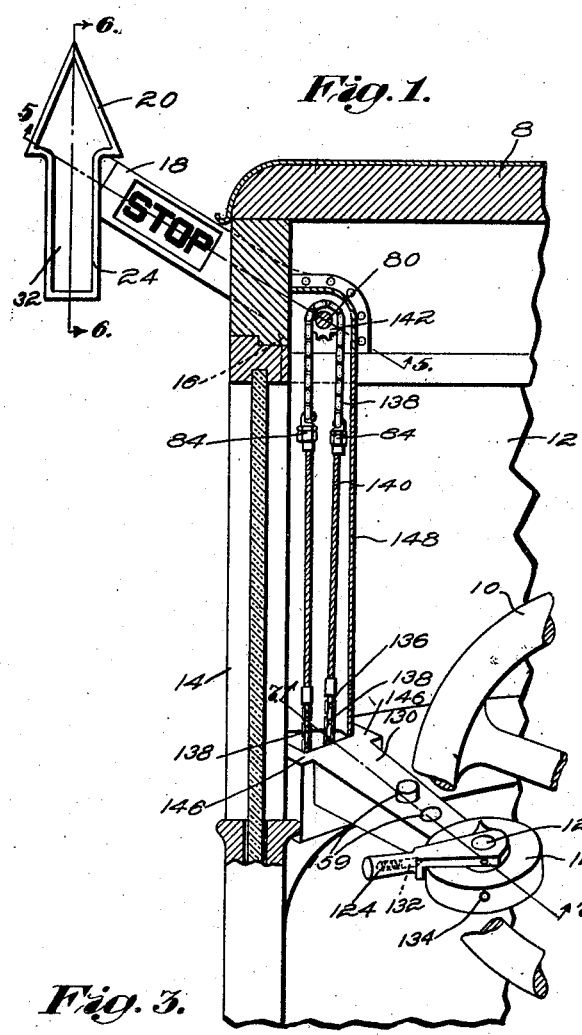

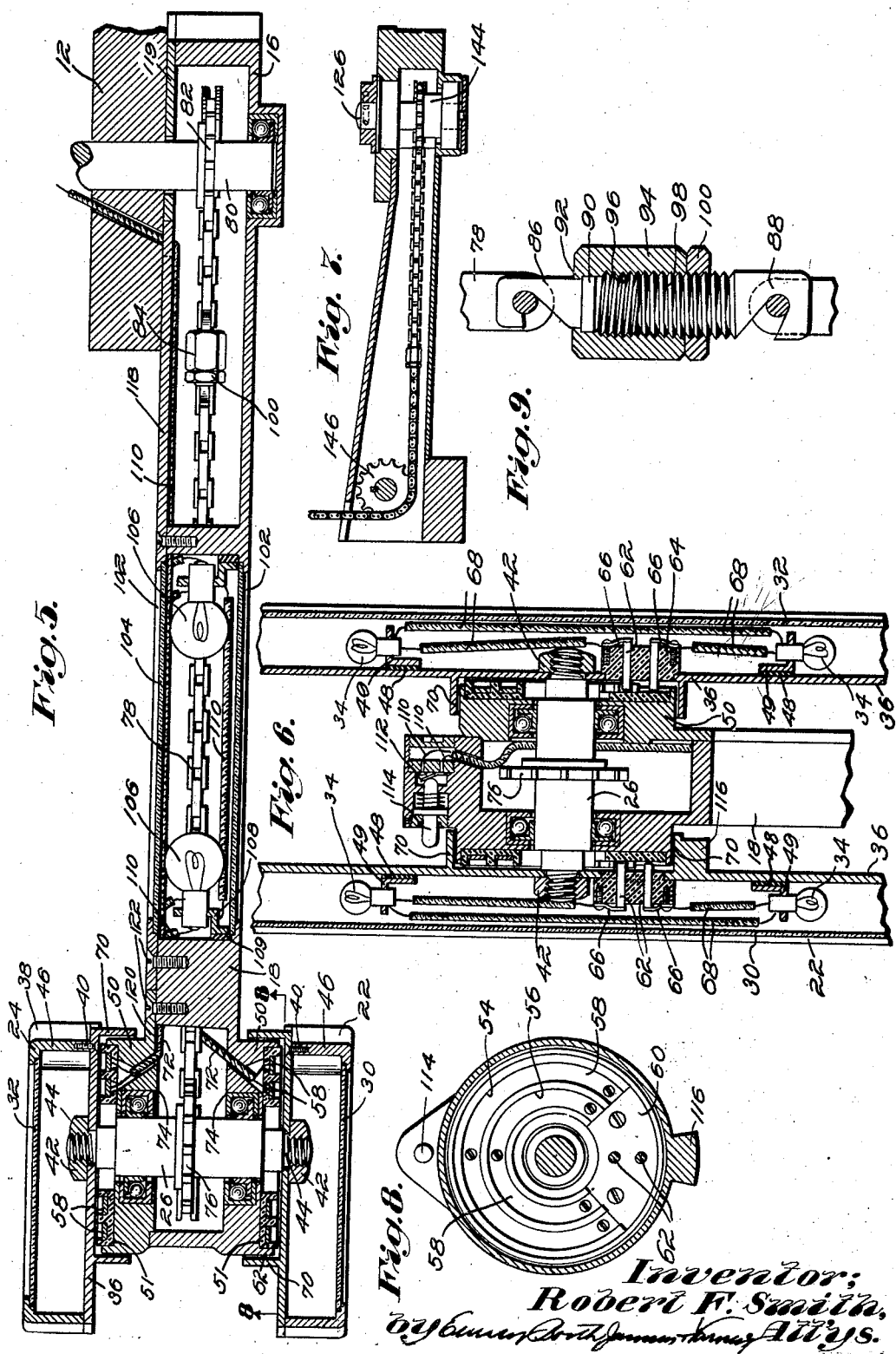

Patented June 9, 1931

1,809,362

UNITED STATES PATENT OFFICE

ROBERT F. SMITH, OF LYNN, MASSACHUSETTS

DIRECTION INDICATOR

Application filed February 5, 1927. Serial No. 166,139.

This invention aims to provide an improved direction indicator for vehicles, and in the accompanying drawings I have shown merely for illustrative purposes a complete embodiment of the invention, wherein:

Fig. 1 is a part elevation and part section of an indicating device, showing a portion only of the vehicle body to which the device is attached;

Fig. 2 is a side elevation of the indicator and arm for supporting it;

Fig. 3 is a side elevation of a vehicle body with the indicating device attached, including a signaling device positioned at the rear end of the vehicle body;

Fig. 4 is a detail diagrammatic view of the indicator and a portion of its supporting arm, showing in full and dotted lines the various positions that said indicator is adapted to occupy;

Fig. 5 is a section taken on the line 5—5 of Fig. 1, showing the arm and bracket for supporting the indicator;

Fig. 6 is a detail vertical section taken on the line 6—6 of Fig. 1, showing the connections between the indicator and the supporting arm;

Fig. 7 is a vertical section taken on the line 7—7 of Fig. 1;

Fig. 8 is a detail section taken on the line 8—8 of Fig. 5;

Fig. 9 is a detail longitudinal section through a coupling device for the endless operating member for the indicator;

Figure 10:
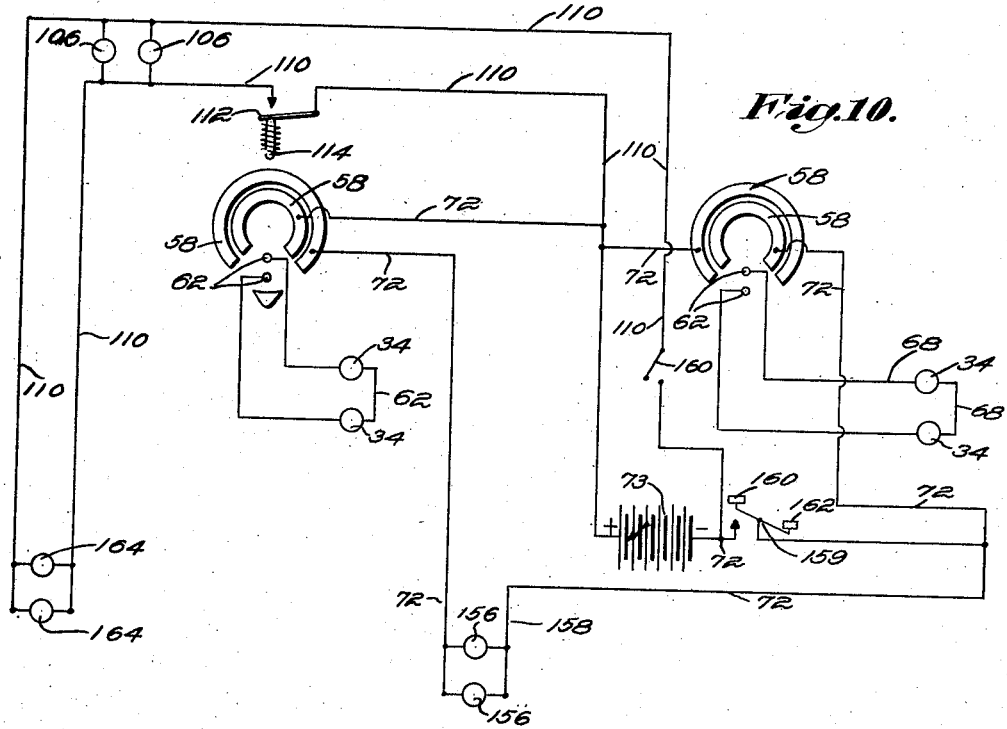
Fig. 10 is a diagrammatic view of the device showing wiring circuits for the various elements thereof.
Figure 11:
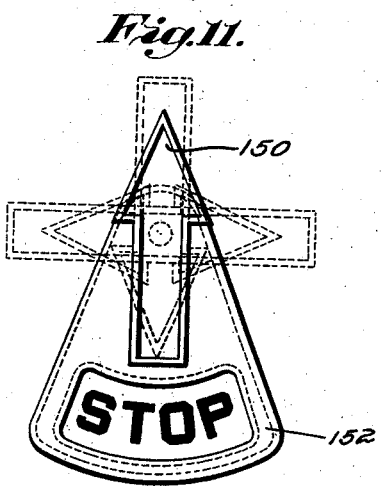
Fig. 11 is a rear elevation of the signaling device arranged at the rear of the vehicle.

In the drawings, referring particularly to Fig. 1, I have shown a portion of the top 8 of a vehicle together with a portion of the steering wheel 10 in its proper relation to said top 8. The view of the top here shown is a section taken transversely of the vehicle approximately on the line of the steering wheel showing part of the windshield 12 in elevation and a door 14 in section.

Secured to the upper portion of said top, herein to the front face 15 above the windshield, is a bracket 16 having an obliquely disposed arm 18 extending upwardly and outwardly from said top for supporting at its upper end a suitable indicator, said indicator being high enough with relation to the top and far enough out from the side thereof so as to be clearly visible either from in front or from the rear of the vehicle, yet close enough to the side of the vehicle to be within the outer edge of the fenders and mudguards of the vehicle, which protect the indicator from being hit or broken off by passing vehicles or objects passed by the vehicle.

The indicator 20, as shown most clearly in Figs. 2, 3, 5 and 6, is formed in two parts 22 and 24, which parts are secured to opposite ends of a stud or shaft 26 rotatably mounted in bearings 28 carried in the upper end of the arm 18, said two sections being arranged to rotate in unison from a neutral position, shown in full lines at $a$, Fig. 4, wherein said indicator points upwardly to the positions $b$ or $c$ pointing respectively to the left and right, as shown in dotted lines in said Fig. 4. The position $a$ indicates that the vehicle is going straight on, the position $b$ indicates a left turn and $c$ a right turn. Said indicator may also be turned to a position $d$ pointing downwardly and indicating that the vehicle is about to come to a stop.

Each of the sections 22 and 24 of the indicator is hollow and provided with transparent front and rear walls 30 and 32 respectively. Arranged within said sections are electric lamps 34 adapted to be lighted at night or when desired to illuminate certain positions of the indicator.

Although I have chosen in the present example to illustrate the indicator as made in two parts, respectively arranged on opposite sides of the supporting arm, it is to be understood that the invention is not limited to this arrangement.

For convenience in assembling, each indicator part is also made in two sections including a base 36 and a cover 38 which latter is secured to the base in any appropriate manner, such for example as by screws 40. The base 36 is secured to the end of the stud or shaft 26 by means of a nut 42 engaging the screw threaded reduced end 44 of the shaft 26. In this manner said plate will be securely fastened to the shaft and be caused to rotate therewith. The cover 38 has a peripheral flange 46 extending entirely around the same and this flange and said base 36 embody in the present example the form of an arrow. The depth of the flange 46 is sufficient to enclose the lamps 34 which are herein supported in appropriate brackets 48 secured to the base 36.

The arm 18 carries at its upper end laterally projecting bosses 50 within which the bearings 28 are mounted. These bosses are each recessed in their outer faces at 51 to receive insulating discs 52 which are provided, herein in their outer faces, with circular grooves 54 and 56 to receive circular commutator plates 58 composed of metal or other suitable current conducting material. The plates 58 are interrupted at certain selected points and set within said interruptions are insulating segments 60 constituting neutral zones for a pair of contact pins or brushes 62. These brushes are slidably arranged in blocks of insulating material 64 secured herein to the adjacent portion of each base 36.

The brushes 62 are yieldingly maintained in positions to contact with the faces of the segments 60 and the commutator plates 58 by springs 66 and said springs are connected, by conductors 68, in circuits including the filaments of the elective lamps 34.

The segment 60 for each indicator section is arranged in a position on the arm 18 so as to be engaged by the brushes 62 when the indicating arrow is pointing upwardly, as shown by the position a, Fig. 4. But as said indicator is turned to the right or left the electric circuit, including the commutator segments 58 and the pins 62, will be closed, provided said circuit is completed at all other points, to light the lamps 34 and thus illuminate the faces of the indicator parts 22 and 24, at least by the time they reach the positions c and b in Fig. 4, thus indicating to approaching or passing vehicles coming either from the front or rear of the vehicle that the vehicle herein is to make a turn either to the right or to the left or to stop. The electric circuit, including the lamps 34, may be completed in any suitable manner, but herein I provide metal brackets 48 which are secured to but separated by insulation 49 from the bases 36 which are likewise of metal, and a wire constituting a part of the circuit for said lamps conducts current from one to the other of said lamps.

The bases 36 are provided with concentric angular flanges 70 which encircle the bosses 50, overlapping the same a considerable distance so as completely to encircle and protect the circuit making and breaking devices including the segments 58 and 60.

The arm 18 is herein hollow and forms a conduit for wires 72 which extend from the commutators 58 through suitable orifices 74 formed in the bosses 50, and thence downwardly through the hollow arm to any appropriate source of electric current, not shown. The hollow arm 18 also forms a housing for the indicator operating means 20, said operating means herein including a sprocket 76 attached to the shaft 26 and a chain 78 engaging said sprocket and extending through said arm to a counter-shaft 80 journaled to rotate in the bracket 16 attached herein to the front part of the vehicle windshield. The shaft 80 also has secured thereto a sprocket 82 over which said chain 78 runs, whereby rotation of said shaft 80 will impart a like movement to the shaft 26 and its sprocket 76.

Although I have illustrated the member for operatively connecting the sprocket 82 with the sprocket 76 as a chain, it is to be understood that the invention is not limited to the use of a chain.

In order to eliminate slack in said chain or endless member 78 I have provided a coupling 84. This coupling desirably includes terminal members 86 and 88 adapted for connection respectively with the ends of the endless member 78. One of these terminal members, herein the member 86, has a flanged end 90 arranged to rotate against a shoulder 92 formed interiorly of one end of a tubular casing 94. The casing 94 is also threaded internally at 96 to receive and engage the screw-threaded end 98 of the member 88, while a lock nut 100 also has screw-threaded engagement with the member 98 and is arranged to be set down against the end of the casing 94 when the member 88 has been properly adjusted therein, to hold said member in adjusted position. The co-operating parts 94 and 98 are long enough to allow for sufficient relative longitudinal movement between the members 88 and 86 to take up wear or stretch in the chain and thus keep it properly tensioned so that no lost motion will take place between the indicator 20 and the operating instrumentalities therefor.

Although I have hereinbefore explained that the indicator 20 may be moved to point downwardly as shown in the position d, Fig. 4, to indicate that the motor vehicle carrying the indicator is to come to a stop, it may be possible that this position of the indicator would not mean anything to those not familiar with the signaling system employed. Therefore to make sure that the intentions of the operator of the vehicle are understood by others an illuminated sign is provided bearing the word "Stop" which may be seen from in front or from the rear of the vehicle, and this sign may be and desirably is arranged to be illuminated when desired or at the time the indicating arrow 20 is pointing downward. This illuminated sign may be placed in any convenient location on the vehicle, but for convenience it is arranged in the hollow arm 18 between the indicator 20 and the vehicle body, as shown most clearly in Figs. 1 and 5. To make this most effective the arm 18 has openings 102 in the front and rear faces thereof containing windows of transparent material 104 which may be glass or any other appropriate material, and between said windows I provide lamps 106 which are mounted in metal brackets 108 secured to but insulated by strips 109 from the metal arm 18, said brackets being connected together and in a circuit formed by conductors 110.

The lamps 106 may be lighted in any appropriate manner and at suitable times in the operation of the device—desirably this is automatically done provided the circuit is otherwise closed when the arrow 20 is pointing downwardly—through the conductors 110 adapted to be electrically connected by a switch 112 which at the appropriate time is closed by a spring plunger 114 protruding from the face of the arm 18. The plunger 114 lies in the path of a cam-like member 116 carried herein by the indicator member 22 and of such a length that the contact is made only when the arrow is pointing downwardly. The conductors 110 may be led through the hollow arm 18 in any suitable manner to the source of current which supplies current to the lamps 34.

For convenience in assembling or replacing parts of the mechanism enclosed within the hollow arm I provide covers 118, 119 and 120, herein for one side of said arm, which covers are secured in place by screws 122.

Motion may be imparted to the indicator 20 in any appropriate manner, but desirably this is effected by an operating handle 124 mounted adjacent to the steering wheel 10 in a convenient position for the operator to manipulate without taking his hand from the steering wheel. The handle 124 is secured to the end of a shaft 126, herein rotatably arranged in a cylindrical casing 128 formed at the end of a hollow arm 130. A spring-pressed detent 132 is arranged in said handle 124 to engage suitably placed recesses 134 formed in the outer face of said cylindrical casing 128 at distances apart corresponding to the positions $a$, $b$, $c$ and $d$ of the indicator 20, so that as said handle is moved around said casing the detent 132 will snap into the several recesses and tend to hold the indicating arrow 20 in the desired positions.

The shaft 126 may be operatively connected with the shaft 80 bearing the sprocket 82 by any appropriate means, but herein I have provided for this purpose an endless member 136 composed in part of sprocket chain sections 138 and in part of flexible cables 140, which sections are connected together by suitable couplings similar to the coupling 84 shown in Fig. 9, except that one of the coupling members is arranged to receive a cable end instead of the end of a chain. The endless member 136 is arranged to run over a sprocket 142 secured on the end of the shaft 80 which extends through the front 12 of the vehicle, while the opposite end of said endless member engages a sprocket 144 secured to the shaft 126. Idlers 146 are rotatably arranged to engage the endless member between the operating handle 124 and the sprocket 142 to maintain the endless member substantially parallel for the greater portion of its length with the side wall of the motor vehicle, and to enclose said endless member the arm 130 is hollow and extends obliquely from the casing 128 into the adjacent corner of the vehicle where it is secured in any appropriate manner to the side thereof.

A casing 148 extends from the arm 130 upwardly to the shaft 80, thereby completely enclosing the remaining portion of the endless member and at the same time completing the housing or conduit which entirely conceals the operating instrumentalities from the operating handle 126 to the indicator 20. It is however to be understood that the invention is not limited to the particular operative connecting means herein shown.

Where an endless driving element is used between the handle 124 and the shaft 80 and also an endless element is employed between the shaft 80 and the shaft 26 supporting the indicators 20, it is desirable that tension adjusting devices be used in both stretches of said endless member, therefore I have shown two adjusting couplings 84 in this arrangement in Fig. 1, one on either side of the sprocket 142, so that when slackness occurs in any of the chain or driving elements, this slackness may first be taken up in the chain 78 and then by careful adjustment of the two couplings 84 in the endless element 140, the proper relation between the operating handle 124 and the indicator may be maintained.

It is within the scope of the present invention to provide an additional indicator at the rear of the vehicle similar to the part 24 of the indicator 20 to give some at least of the signals given by the latter. To this end I provide an indicator 150, herein secured to the rear end of the shaft 80, which in this case is extended longitudinally of the vehicle above the side windows to the rear thereof wherein it is journaled at 152. The indicator 150 has a transparent rear face 154 that is adapted to be illuminated when conditions require by lamps 156 enclosed within said indicator and herein connected in circuit with the lamps 34 in the front indicator 20.

In Fig. 10 of the drawings I have illustrated one hook-up for the various elements of the signaling device. In this arrangement the rotary switches including the commutator rings 58 show their main circuits 72 in circuit with a battery 73. This circuit is extended to the rear of the vehicle and includes the lights 156 in the rear indicating member 150. Also included in this circuit is a switch 159 constituting the master switch for that part of the whole electrical system which illuminates the movable indicators 22, 24 and 150. This switch is mounted in a convenient location near the operator's seat, for example in the arm 130 directly back of the operating handle 124, and herein comprises two buttons 160 and 162. By pressing the button 160 the circuit including said switch will be closed, lifting the button 162, and upon pressing the button 162 said circuit 72 will be broken. The circuits including the lamps 34 and conductors 68, hereinbefore described, contain the pins 62. Upon the rotation of the indicating members 30 and 32 these pins engage the commutator rings 58 at the proper points in the rotation of said indicators and complete the said electric circuits, and if the switch 159 is closed the lamps in the several movable signaling devices will be illuminated. Upon the further rotation of the indicator members 20 and 150 to the positions thereof indicating "Stop" the cam 116 will engage the pin 114 to move the terminal 112 into engagement with the other terminal of the circuit 110. The lamps 106 in the arm 18 will likewise be illuminated by this movement of the indicator to indicate that the vehicle is about to come to a stop provided said circuit is completed at all other points.

It is, however, desirable that this circuit 110 be controlled independently of the circuit 72 including the lamps 34 so that the former may be closed continually or during operations of the vehicle even though it be light enough to see said indicators 22, 24 and 150.

To this end a switch 160 is included in said circuit 110. The switch 159 has no effect whatsoever upon the latter circuit.

The indicator 150 is herein associated with a transparent walled housing 162 having its transparent window directed rearwardly and bearing upon its surface the word "Stop". Lamps 164 (see Fig. 10) are contained in said housing and in the circuit 110 which includes the lamps 106 so that when the switch 112 is closed the rear stop signal will be illuminated simultaneously with the forward one in the arm 18.

It is to be understood that the invention is not limited to the specific embodiment herein shown.

Claims.

1. In a device of the character described, the combination of an oscillatory direction indicator, an operating member therefor, endless operating geared connections between said indicator and said operating member, and positive adjusting means arranged in each of the runs of said endless connection adapted to maintain said indicator and operating member in predetermined operative relation.

2. In a device of the character described, the combination of an oscillatory direction indicator, an operating member therefor, means for stopping said indicator at a plurality of selected points, endless operating geared connections between said indicator and said operating member, and positive adjusting means arranged in each of the runs of said endless connection adapted to maintain said indicator and operating member in predetermined operative relation.

In testimony whereof, I have signed my name to this specification.

ROBERT F. SMITH.